United States Patent
Krijn et al.

(10) Patent No.: US 9,459,399 B2
(45) Date of Patent: Oct. 4, 2016

(54) LIGHT-EMITTING PANEL WITH TRANSPARENT CELLULAR SUPPORT PANEL

(75) Inventors: Marcellinus Petrus Carolus Michael Krijn, Eindhoven (NL); Fetze Pijlman, Eindhoven (NL); Stefan Henricus Swinkels, Valkenswaard (NL); Gabriel-Eugen Onac, Veldhoven (NL); Michel Cornelis Josephus Marie Vissenberg, Roermond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 35 days.

(21) Appl. No.: 14/241,469

(22) PCT Filed: Aug. 29, 2012

(86) PCT No.: PCT/IB2012/054435
§ 371 (c)(1),
(2), (4) Date: Feb. 27, 2014

(87) PCT Pub. No.: WO2013/035016
PCT Pub. Date: Mar. 14, 2013

(65) Prior Publication Data
US 2014/0226360 A1 Aug. 14, 2014

(30) Foreign Application Priority Data
Sep. 6, 2011 (EP) .................................. 11180239

(51) Int. Cl.
*F21V 8/00* (2006.01)
*E04B 2/74* (2006.01)
(Continued)

(52) U.S. Cl.
CPC ........... *G02B 6/0096* (2013.01); *E04B 2/7416* (2013.01); *F21V 33/006* (2013.01); *F21V33/0012* (2013.01); *F21W 2131/402* (2013.01); *F21Y 2101/02* (2013.01); *F21Y 2105/001* (2013.01)

(58) Field of Classification Search
CPC .. F21V 33/006; F21V 33/0088; F21V 33/00; F21V 11/14; F21Y 2105/001; G02B 6/0096; F21W 2131/40; F21W 2131/401; F21W 2131/402; F21W 2131/403; F21W 2131/4035; F21W 2131/405; F21W 2131/406; F21W 2131/407; F21W 2131/409; F21W 2131/411
USPC ........................................................ 362/576
See application file for complete search history.

(56) References Cited

U.S. PATENT DOCUMENTS 5,532,440 A * 7/1996 Fujiwara ................... E04B 1/86
181/289
6,149,284 A * 11/2000 Wang ...................... F21S 4/001
362/123

(Continued)

FOREIGN PATENT DOCUMENTS

DE    202008006335 U1   6/2009
EP        1840449 A1   10/2007
(Continued)

Primary Examiner — Robert May
(74) Attorney, Agent, or Firm — Meenakshy Chakravorty

(57) ABSTRACT

The present invention relates to a light-emitting panel (1) comprising: a first panel sheet (11), the first panel sheet being optically transparent; a second panel sheet (12); and a cellular support panel (10) sandwiched between the first panel sheet and the second panel sheet. The cellular support panel comprises optically transparent cell walls (13) defining a plurality of tubular channels (14) extending from the first panel sheet towards the second panel sheet. The light-emitting panel (1) further comprises a two-dimensional light-source array (15;16;24;27) comprising a plurality of light-sources (18a-b;19a-b) each being arranged to emit light into at least one of the tubular channels of the cellular support panel. Various embodiments of the present invention provide a cost-efficient light-emitting panel with advantageous light-emission and mechanical properties.

13 Claims, 3 Drawing Sheets

(51) Int. Cl.
*F21V 33/00* (2006.01)
*F21W 131/402* (2006.01)
*F21Y 105/00* (2016.01)
*F21Y 101/02* (2006.01)

(56) References Cited

U.S. PATENT DOCUMENTS

| | | | |
|---|---|---|---|
| 9,261,264 B1* | 2/2016 | Ward | F21S 2/00 |
| 2007/0247842 A1 | 10/2007 | Zampini et al. | |
| 2009/0119476 A1 | 5/2009 | Jernigan et al. | |
| 2010/0124243 A1 | 5/2010 | Hussell et al. | |
| 2014/0299408 A1* | 10/2014 | Swinkels | G10K 11/172 |
| | | | 181/289 |

FOREIGN PATENT DOCUMENTS

| | | |
|---|---|---|
| JP | 2003336339 A | 11/2003 |
| JP | 2006244779 A | 9/2006 |
| JP | 2006285042 A | 10/2006 |
| JP | 2006310319 A | 11/2006 |
| JP | 2007265646 A | 10/2007 |
| JP | 2009209680 A | 3/2008 |
| JP | 2008214966 A | 9/2008 |
| JP | 2010123378 A | 6/2010 |
| JP | 2010272483 A | 12/2010 |
| KR | 2010007684 A | 1/2010 |
| KR | 2011030284 A | 1/2010 |
| KR | 986903 B1 | 10/2010 |
| WO | 03083529 A1 | 10/2003 |
| WO | 2009119476 A1 | 10/2009 |
| WO | 2011067986 A1 | 6/2011 |

* cited by examiner

LIGHT-EMITTING PANEL WITH TRANSPARENT CELLULAR SUPPORT PANEL

FIELD OF THE INVENTION

The present invention relates to a light-emitting panel.

BACKGROUND OF THE INVENTION

In, for example, an office environment, various types of relatively rigid panels are used for different purposes. For instance, panels are used as partition walls or acoustic tiles. By providing such and other panels as light-emitting panels, further functionality can be added. Such functionality may, for example, include general illumination and controllable privacy for meeting rooms etc.

JP-2008/214966 discloses a light-emitting panel comprising a main body made of a transparent material which also forms multiple longitudinally extending ribs so that through holes are formed along the length of the panel. An illuminating device is inserted through the through hole from the edge of the panel to illuminate the ribs along the plane of the light-emitting panel.

The light-emitting panel according to JP-2008/214966 provides illumination. There, however, appears to be room for improvement of, for example, the uniformity of the light emitted by the light-emitting panel. There also appears to be room for improvement in terms of cost and mechanical stability of the light-emitting panel.

SUMMARY OF THE INVENTION

In view of the above-mentioned and other drawbacks of the prior art, a general object of the present invention is to provide an improved light-emitting panel.

According to a first aspect of the present invention there is provided a light-emitting panel comprising: a first panel sheet, the first panel sheet being optically transparent; a second panel sheet; and a cellular support panel sandwiched between the first panel sheet and the second panel sheet, the cellular support panel comprising optically transparent cell walls defining a plurality of tubular channels extending from the first panel sheet towards the second panel sheet, wherein the light-emitting panel further comprises a two-dimensional light-source array comprising a plurality of light-sources each being arranged to emit light into at least one of the tubular channels of the cellular support panel.

The light-sources in the two-dimensional light-source array may advantageously be solid state light-sources. Solid state light-sources are light-sources in which light is generated through recombination of electrons and holes. Examples of solid state light-sources include light-emitting diodes (LEDs) and semiconductor lasers.

The term "optically transparent" should be understood to mean "allowing at least a fraction of incident light to pass", and includes "completely" transparent as well as partly transparent (translucent). Moreover, an optically transparent sheet or wall may comprise portions that are optically transparent and other portions that are not. For instance, a patterned panel sheet with portions that are optically transparent and other portions that are opaque should be understood to be an optically transparent panel sheet.

Moreover, the cellular support panel may be a substantially planar structure, and the two-dimensional light-source array may define a plane that is substantially parallel with the cellular support structure. Furthermore, the two-dimensional light-source may extend across a two-dimensional area that substantially corresponds to the light-emitting area of the light-emitting panel.

The present invention is based on the realization that a cost-efficient light-emitting panel with advantageous light-emission and mechanical properties can be achieved by adding a two-dimensional light-source array to a panel formed by a cellular support panel sandwiched between transparent cover layers.

It should be noted that the light-source array need not be an ordered array, but may advantageously be an irregular array.

The cellular support panel and the cover layers provide for a light-weight and structurally strong panel, while the two-dimensional light-source array adds the function of light-emission to the panel. The tubular channels defined by the optically transparent cell walls of the cellular support panel interact with the light emitted by the light-sources into the tubular channels to reduce the occurrence of glare and provide for a more uniform output of light than in prior art solutions.

The tubular channels may advantageously have a smooth surface finish. In this case rays emitted by a certain light-source that hit the side-wall of a channel will be partly reflected due to Fresnel reflection. The remaining part will be transmitted by this side-wall. For a viewer, the reflected ray appears to originate from a different location. In other words, the more reflections from the side-walls, the more the grid of discrete light-sources appears to be smoothed out.

The two-dimensional light-source array may be attached to the tubular support panel directly or via one of the first and second panel sheets.

Advantageously, the two-dimensional light-source array may be provided as an open grid type structure. In such a structure, there is no sheet-like carrier for the light-sources. This means that light and, where applicable, air can pass through the two-dimensional light-source array. Moreover, this provides for a reduced cost, since a large area circuit board, is not needed.

According to various embodiments of the present invention, the two-dimensional light-source array may be an open grid of LEDs that is attached to a first side of the cellular support panel, the LEDs being arranged to emit light into the tubular channels of the cellular support panel so that the light emitted by the LEDs travels from the first side to a second side of the cellular support panel, opposite the first side.

In various embodiments of the light-emitting panel according to the present invention, the two-dimensional light-source array may comprise a plurality of metal wires defining a grid with nodes; and a plurality of solid-state light-sources, such as LEDs, each being arranged at a respective one of the nodes and electrically and mechanically connected to two adjacent metal wires of the plurality of metal wires. The metal wires may, furthermore, be non-crossing metal wires, which provides for convenient driving of the solid-state light sources using a small number of connectors, which further adds to the cost-efficiency of the light-emitting panel according to various embodiments of the invention.

To provide acoustic damping functionality to the light-emitting panel, at least one of the first panel sheet and the second panel sheet may comprise a plurality of through holes, so that reflection of incident sound waves is reduced.

Furthermore, the second panel sheet may be optically transparent. In such embodiments, the light-emitting panel is at least partly optically transparent, which allows for use of the light-emitting panel as, for example, "glowing" semitransparent walls for cubicles, as separation walls in between desks, or as privacy windows (more privacy when the light-sources, such as LEDs, are turned on).

In various embodiments of the light-emitting panel according to the present invention, the plurality of light-sources may comprise a first set of light-sources arranged to emit light towards the first panel sheet and a second set of light-sources arranged to emit light towards the second panel sheet. Hereby, emission of light from both (opposite) sides of the light-emitting panel can conveniently be provided.

Alternatively, or in addition, the light-emitting panel may comprise a first two-dimensional light-source array comprising a plurality of light-sources arranged to emit light through the tubular channels towards the first panel sheet and a second two-dimensional array arranged to emit light through the tubular channels towards the second panel sheet.

According to various embodiments of the light-emitting panel, furthermore, the two-dimensional light-source array may be sandwiched between the first panel sheet and the second panel sheet. This may be advantageous since the light-sources are offered some protection by the first panel sheet and/or the second panel sheet. However, the two-dimensional light-source array may alternatively be provided on the outside of the first (or second) panel sheet.

Moreover, the second panel sheet may comprise a first optically transparent layer and a second layer, and the two-dimensional light-source array may be sandwiched between the first optically transparent layer and the second layer. This may further facilitate production of the light-emitting panel and reduce the risk of damaging the two-dimensional light-source array during manufacturing or use of the light-emitting panel. The second layer of the second panel sheet may or may not be optically transparent. The first panel sheet may be constructed in the same way to provide for emission of light from both sides of the light-emitting panel.

The first optically transparent layer and the second layer may, for example, be laminated together, with the two-dimensional light-source array arranged there between.

According to various embodiments, furthermore, the light-emitting panel may comprise a first cellular support panel comprising optically transparent cell walls and a second cellular support panel comprising optically transparent cell walls, and the two-dimensional light-source array may be arranged between the first cellular support panel and the second cellular support panel. In these embodiments, the two-dimensional light-source array is well protected and visibility of the two-dimensional light-source array in its off-state may be reduced. These embodiments may advantageously be combined with embodiments where the two-dimensional light-source array comprises a first set of light-sources arranged to emit light towards the first panel sheet and a second set of light-sources arranged to emit light towards the second panel sheet.

In embodiments of the light-emitting panel according to the present invention, each of the light-sources may be configured to emit light along an optical axis that is tilted towards a wall of a corresponding one of the tubular channels. This may further reduce the occurrence of glare, and may be achieved, for example, by tilting the light-sources and/or by using light-sources that emit light at an angle, Such light-sources by be provided, for example, by using side-emitting solid state light-sources and/or using light-sources with primary optics that directs the light along such a tilted optical axis.

To provide for a good uniformity and low glare of the light emitted by the light-emitting panel, an average distance between adjacent light-sources in the two-dimensional light-source array may advantageously be less than 50 mm.

According to various embodiments, the optically transparent cell walls of the cellular support panel may advantageously be curved in a cross-section of the cellular support panel parallel to the first panel sheet. In other words, the tubular channels defined by the optically transparent cell walls may have non-rectangular cross-sections. According to one exemplary embodiment, the tubular channels may have substantially circular cross-sections. Through the use of curved cell walls, glare can be reduced as compared to the case with straight cell walls. The optically transparent cell walls may also be curved in a cross-section perpendicular to the first panel sheet. This is expected to further improve the screening of the light-sources and thus reduce glare.

In various embodiments, furthermore, at least one of the first panel sheet and the second panel sheet may comprise wavelength converting material, such as organic or inorganic phosphors. In this case, the light-sources in the light-source array (such as LEDs) may emit light in the blue part of the visible spectrum. Part of this blue light is converted by the phosphors into yellow light. The remainder of the blue light in combination with the yellow light is perceived by the viewer as white light. The scattering behaviour of the layer containing the phosphor and any additional layers that have a diffuse scattering effect can be tuned such as to reduce visibility of the light-sources.

Of course, a combination of light-sources emitting different colours may be used. Similarly, different regions of the light-emitting panel may have different phosphorous materials such as to create light effects or light patterns.

Moreover, at least one of the first panel sheet and the second panel sheet may be microstructured for shaping light output by the light-sources. Such microstructures may, for example, be used to direct the light emitted by the light-emitting panel in a desired direction, to further reduce glare and/or to provide for other light effects or light patterns. Moreover, the microstructures may be the same over the whole area of the light-emitting panel or they may be localized and in registration with the channels or in registration with the light-sources or both. Different regions of the light-emitting panel may have different micro-structured patterns such as to create more complicated light effects or light patterns.

BRIEF DESCRIPTION OF THE DRAWINGS

These and other aspects of the present invention will now be described in more detail, with reference to the appended drawings showing currently preferred embodiments of the invention, wherein.

DETAILED DESCRIPTION OF THE EMBODIMENTS

Figure 1:
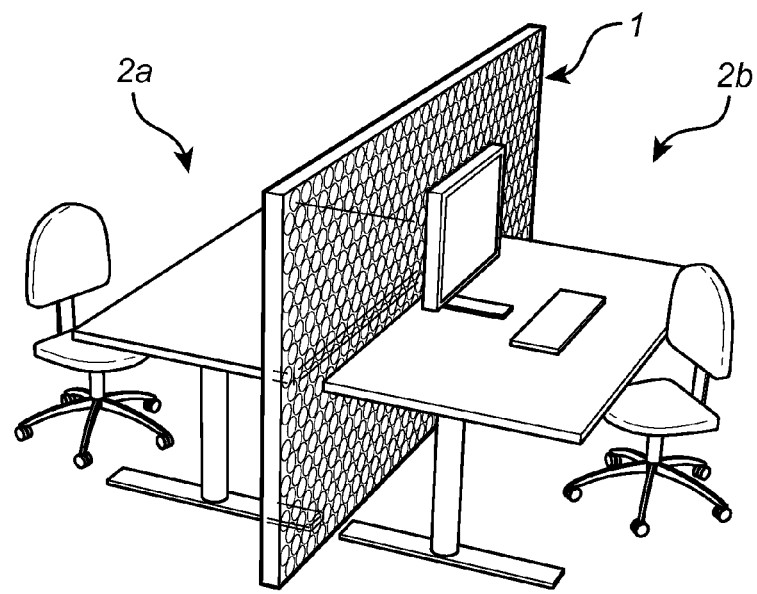
FIG. 1 schematically shows an exemplary application of the light-emitting panel according to various embodiments of the present invention, in the form of a separation wall to separate areas in an office space.

In the following description, the present invention is mainly described with reference to a light-emitting panel used as a separation wall, in which the two-dimensional light-source array is provided in the form of an open grid with a plurality of metal wires defining a grid with nodes and a plurality of LEDs, each being arranged at a respective one of the nodes and electrically and mechanically connected to two adjacent metal wires.

It should, however, be noted that this by no means limits the scope of the invention, which is equally applicable to, for example, a light-emitting panel used for any other purpose, for instance a ceiling tile, a wall tile or a free standing acoustic tile. Furthermore the two-dimensional light-source array may instead be based on another carrier, such as an open structure formed from strips of a flexible or rigid printed circuit board. Moreover, many other configurations of the tubular channels than the substantially cylindrical channels in the drawings are feasible and may be preferable. For example, the tubular channels may have a generally rectangular cross-section and/or may be more or less irregular.

FIG. 1 schematically illustrates an exemplary application for embodiments of the light-emitting panel 1 according to the present invention, in the form of a separation wall arranged to divide an office space into two separate working areas 2a-b. The light-emitting panel 1 may be intended to add to the general illumination of at least one of the working areas 2a-b and may be controllable between lighting setting to, for example, include a "privacy" setting, where the emission of light prevents or at least obstructs view through the light-emitting panel 1.

Figure 2:
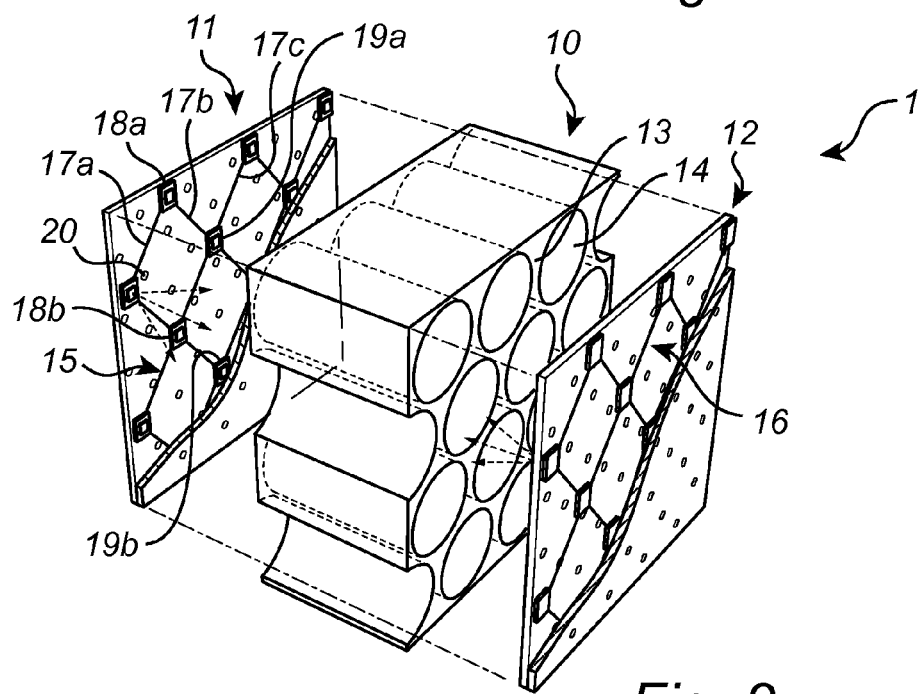
FIG. 2 is a schematic exploded view of a portion of the light-emitting panel in FIG. 1.

With reference to FIG. 2, which is a schematic exploded view of a portion of an embodiment of the light-emitting panel 1 in FIG. 1, the light-emitting panel 1 comprises a cellular support structure 10, an optically transparent first panel sheet 11, and an optically transparent second panel sheet 12. The cellular support structure 10 is sandwiched between the first panel sheet 11 and the second panel sheet 12, and comprises optically transparent cell walls 13 that define a plurality of tubular, in this case substantially cylindrical, channels 14 extending from the first panel sheet 11 towards the second panel sheet 12.

As is schematically illustrated in FIG. 2, the light-emitting panel 1 further comprises a first two-dimensional light-source array, here in the form of a first LED grid 15, and a second two-dimensional light-source array, here in the form of a second LED grid 16.

The first LED grid 15 (as well as the second LED grid 16) is provided in the form of an open grid of metal wires 17a-c with a first set of LEDs 18a-b electrically and mechanically connected to the adjacent first 17a and second 17b metal wires and a second set of LEDs 19a-b electrically and mechanically connected to the adjacent second 17b and third 17c metal wires. Hereby, application of a voltage between, for example, the first 17a and the third 17c metal wires results in light being emitted by the LEDs 18a-b connected between the first 17a and second 17b metal wires as well as by the LEDs 19a-b connected between the second 17b and the third 17c metal wires. It should be noted that the above is a simplified description of a portion of the first LED grid 15 (the second LED grid 16), and that the LED grid 15, in a real application, will typically comprise several additional metal wires and a larger number of LEDs connected to adjacent ones of the metal wires. The function and realization of such an LED grid should, however, be straightforward to those of ordinary skill in the art based on the description provided above.

In addition, as is also schematically indicated in FIG. 2, each of the first panel sheet 11 and the second panel sheet 12 is perforated by through holes 20 to achieve acoustic damping.

In this exemplary embodiment, the first LED grid 15 is integrated in the first panel sheet 11 and the second LED grid 16 is integrated in the second panel sheet 12. This will be described in greater detail below with reference to FIG. 3, which is a cross-section view of the light-emitting panel 1 in FIG. 2.

Figure 3:
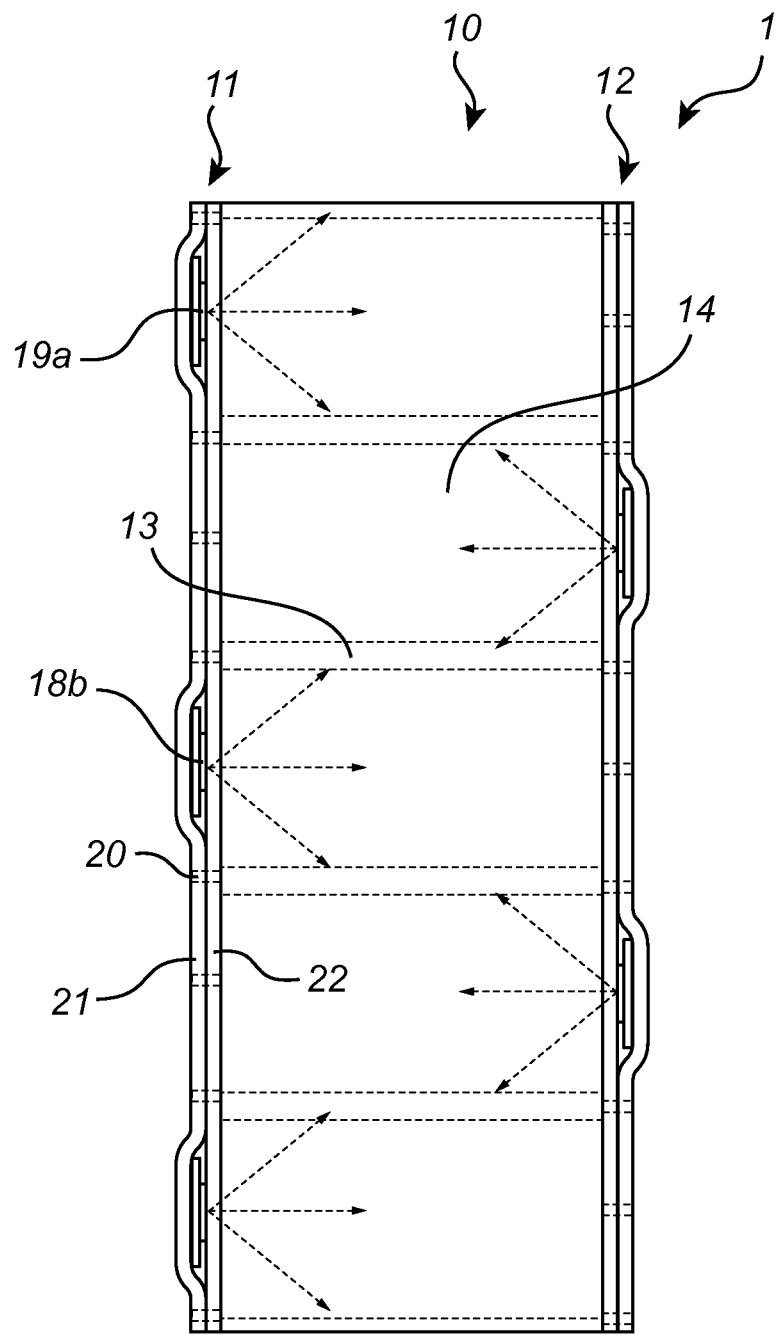
FIG. 3 is a schematic side view of the light-emitting panel in FIG. 2.

With reference to FIG. 3, each of the first panel sheet 11 and the second panel sheet 12 comprises a pair of layers, between which the first LED grid 15 and the second LED grid 16, respectively is laminated. The first panel sheet 11 thus comprises (the second panel sheet is configured in the same way) a first optically transparent layer 21 and a second optically transparent layer 22 and the first LED grid 15 sandwiched between the first optically transparent layer 21 and the second optically transparent layer 22. The first 21 and second 22 optically transparent layers are laminated together so that a composite panel sheet is formed, in which the first LED grid 15 is enclosed. The LEDs 18a-c in the first LED grid 15 are arranged to emit light into the tubular channels 14 of the cellular support panel 10, that is, towards the right in FIG. 3, and the LEDs in the second LED grid 16 are also arranged to emit light into the tubular channels of the cellular support panel 10, that is, towards the left in FIG. 3.

Some further example embodiments of the light-emitting panel 1 in FIG. 1 will now be described with reference to FIGS. 4a-d. The description is mainly provided in terms of differences between the embodiment of FIGS. 2 and 3 and the embodiments that are schematically illustrated in FIGS. 4a-d, respectively.

Figure 4A:
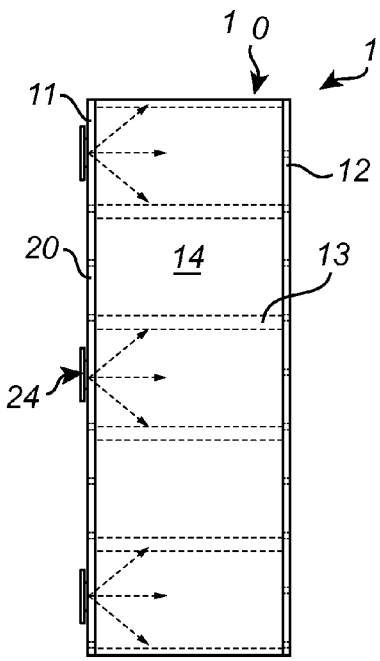
FIGS. 4*a* to 4*d* are schematic side views of various further embodiments of the light-emitting panel in FIG. 1.

In the embodiment of FIG. 4a, the light-emitting panel 1 comprises a single LED grid 24 that is attached to the outside of the first panel sheet 11 instead of being integrated in the first panel sheet 11.

Figure 4B:
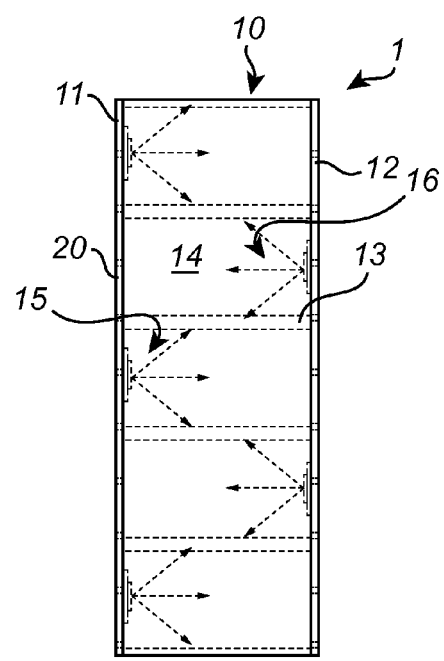

The light-emitting panel 1 according to the embodiment of FIG. 4b comprises first 15 and second 16 LED grids that are attached to the inside (the side facing the cellular support structure 10) of the first 11 and second 12 panel sheets, respectively.

Figure 4C:
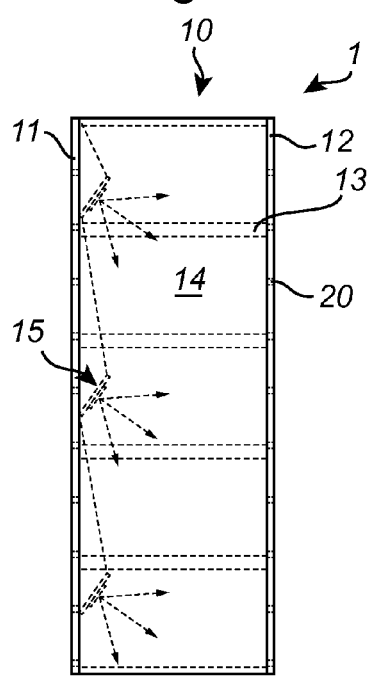

According to the embodiment of FIG. 4c, the LEDs in the LED grid 15 are tilted so that the optical axes of the LEDs become tilted towards respective channel walls 13.

Figure 4D:
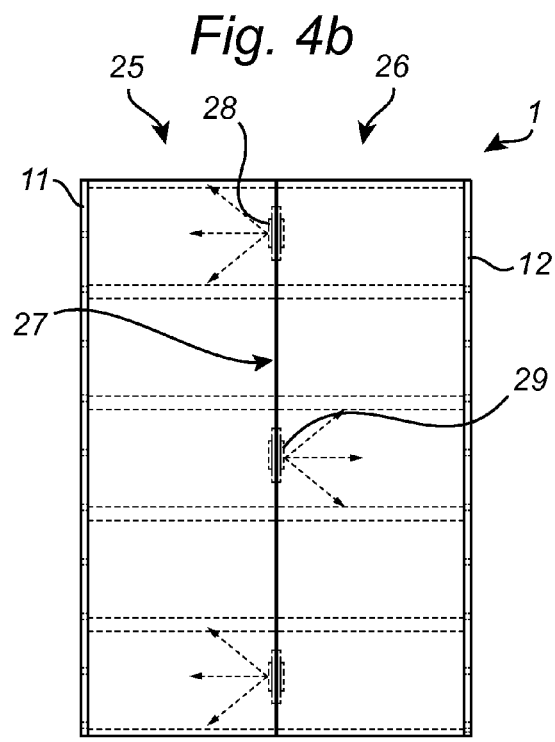

Finally, according to the embodiment in FIG. 4d, the light-emitting panel 1 comprises a first cellular support panel 25 and a second cellular support panel 26 sandwiched between the first 11 and second 12 panel sheets. Between the first 25 and second 26 cellular support panels, an LED grid 27 is arranged. As is schematically indicated in FIG. 4d, the LED grid 27 comprises a first set 28 of LEDs arranged to emit light through the channels of the first cellular support panel 25 and a second set 29 of LEDs arranged to emit light through the channels of the second cellular support panel 26.

Additionally, variations to the disclosed embodiments can be understood and effected by the skilled person in practicing the claimed invention, from a study of the drawings, the disclosure, and the appended claims. For example, one or both of the first and second panel sheets may be microstructured and/or may be coated with a wavelength converting material, such as organic or inorganic phosphors. Moreover, any one or both of the first panel sheet and the second panel sheet may be partially reflective, for example having a pattern with portions that transmit light and portions that reflect light. This may improve the uniformity of light emitted by the light-emitting panel.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light-emitting panel comprising:
   a first panel sheet, the first panel sheet being optically transparent;
   a second panel sheet, at least one of the first panel sheet and the second panel sheet defining a plurality of through-holes; and
   a first cellular support panel sandwiched between the first panel sheet and the second panel sheet, the first cellular support panel comprising optically transparent cell walls defining a plurality of tubular channels extending from the first panel sheet towards the second panel sheet, the cell walls being substantially perpendicular to the first and second panel sheets,
   wherein the light-emitting panel further comprises a first two-dimensional light-source array comprising a first plurality of light-sources each being arranged to emit light into at least one of the tubular channels of the cellular support panel, and
   wherein the first plurality of light-sources comprises a first set of light-sources arranged to emit light towards the first panel sheet and a second set of light-sources arranged to emit light towards the second panel sheet.

2. The light-emitting panel according to claim 1, wherein the first two-dimensional light-source array is an open grid of LEDs that is attached to a first side of the first cellular support panel, the LEDs being arranged to emit light into the tubular channels of the first cellular support panel so that the light travels from the first side to a second side of the first cellular support panel.

3. The light-emitting panel according to claim 1, wherein the first two-dimensional light-source array comprises:
   a plurality of metal wires defining a grid with nodes, wherein each solid-state light-source of the first plurality of solid-state light-sources, is arranged at a respective one of the nodes and electrically and mechanically connected to two adjacent metal wires of the plurality of metal wires.

4. The light-emitting panel according to claim 1, wherein the second panel sheet is optically transparent.

5. The light-emitting panel according to claim 1, wherein first two-dimensional light-source array is arranged to emit light through the tubular channels towards the first panel sheet and wherein the light-emitting panel further comprises a second two-dimensional array comprising a second plurality of light sources arranged to emit light through the tubular channels towards the second panel sheet.

6. The light-emitting panel according to claim 5, wherein the first two-dimensional light-source array is sandwiched between the first panel sheet and the second panel sheet.

7. The light-emitting panel according to claim 6,
   wherein the second panel sheet comprises a first optically transparent layer and a second layer, and
   wherein the first two-dimensional light-source array is sandwiched between the first optically transparent layer and the second layer.

8. The light-emitting panel according to claim 7,
   wherein the light-emitting panel further comprises a second cellular support panel comprising optically transparent cell walls, and
   wherein the first two-dimensional light-source array is arranged between the first cellular support panel and the second cellular support panel.

9. The light-emitting panel according to claim 1, wherein each of the first plurality of light-sources is configured to emit light along an optical axis that is tilted towards a wall of a corresponding one of the tubular channels.

10. The light-emitting panel according to claim 1, wherein the optically transparent cell walls are curved in a cross-section of the cellular support panel parallel to the first panel sheet.

11. The light-emitting panel according to claim 1, wherein the first two-dimensional light-source array is a non-periodic array.

12. The light-emitting panel according to claim 1, wherein at least one of the first panel sheet and the second panel sheet comprises wavelength converting material.

13. The light-emitting panel according to claim 1, wherein at least one of the first panel sheet and the second panel sheet is microstructured for shaping light output by the light-sources.

* * * * *